United States Patent
Otto et al.

(10) Patent No.: US 6,821,153 B2
(45) Date of Patent: Nov. 23, 2004

(54) OVERVOLTAGE PROTECTION MAGAZINE

(75) Inventors: Hans-Dieter Otto, Wipperfürth (DE); Friedhelm Denter, Castrop-Rauxel (DE); Norbert Gaertner, Wuppertal (DE); Klaus-Dieter Burmeister, deceased, late of Wuppertal (DE), by Claudia Burmeister, legal representative

(73) Assignee: Quante AG, Wuppertal (DE)

( * ) Notice: Subject to any disclaimer, the term of this patent is extended or adjusted under 35 U.S.C. 154(b) by 111 days.

(21) Appl. No.: 10/155,018

(22) Filed: May 28, 2002

(65) Prior Publication Data

US 2002/0182921 A1 Dec. 5, 2002

Related U.S. Application Data

(63) Continuation of application No. PCT/EP00/11893, filed on Nov. 28, 2000.

(30) Foreign Application Priority Data

Nov. 29, 1999 (DE) .................................... 299 20 935 U

(51) Int. Cl.⁷ .............................................. H01R 13/66
(52) U.S. Cl. ..................................... 439/620; 361/119
(58) Field of Search ................................ 439/620, 76.1; 361/119

(56) References Cited

U.S. PATENT DOCUMENTS

| | | | |
|---|---|---|---|
| 4,345,294 A | 8/1982 | Forberg et al. ............. | 361/119 |
| 4,504,883 A | 3/1985 | Uchida et al. .............. | 361/119 |
| 4,781,613 A | 11/1988 | Saligny ....................... | 439/391 |
| 5,114,356 A | 5/1992 | Taybl et al. ................. | 439/133 |
| 5,157,580 A | * 10/1992 | Hegner et al. .............. | 361/119 |
| 5,224,881 A | * 7/1993 | Lejuste et al. .............. | 439/709 |
| 5,718,593 A | * 2/1998 | Figueiredo et al. ........ | 439/76.1 |
| 6,196,862 B1 | * 3/2001 | Dooley ........................ | 439/412 |
| 6,556,411 B1 | * 4/2003 | Hoeft et al. ................. | 361/119 |
| 6,654,223 B1 | * 11/2003 | Bippus et al. .............. | 361/118 |
| 6,731,489 B2 | * 5/2004 | Heidorn et al. ............. | 361/119 |

FOREIGN PATENT DOCUMENTS

| | | |
|---|---|---|
| DE | 2338571 | 2/1975 |
| DE | 3014796 | 10/1981 |
| DE | 3921227 | 1/1991 |
| DE | 9101599 | 6/1991 |
| DE | 4008386 | 9/1991 |
| DE | 4423339 | 9/1995 |
| EP | 0 073 740 | 3/1983 |
| EP | 0689365 | 1/2001 |
| WO | WO 97/37407 | 10/1997 |

* cited by examiner

Primary Examiner—Gary Paumen
(74) Attorney, Agent, or Firm—James J. Trussell

(57) ABSTRACT

A telecommunications overvoltage protection magazine (10) permits in the mounting position direct mounting in a telecommunications rack-mounting system behind a junction zone (12) for cable conductors and electrical connection to the junction zone (12), the surge arresters being insertable in a mounting position from below, from above or partly from above and partly from below, more particularly alternatingly from above and below.

9 Claims, 2 Drawing Sheets

OVERVOLTAGE PROTECTION MAGAZINE

CROSS REFERENCE TO RELATED APPLICATIONS

This application is a continuation of international application number PCT/EP00/11893, filed on Nov. 28, 2000, the content of which is incorporated herein by reference and claims the priority of German Patent Application No. 299 20 935.0, filed on Nov. 29, 1999.

BACKGROUND OF THE INVENTION

1. Field of the Invention

The invention relates to a telecommunications overvoltage protection magazine.

It is in this field that numerous junction modules mostly in the form of junction blocks are usually provided in suitable rack-mounting systems in distribution points, at least on the line side of which some means of overvoltage protection are needed as a rule.

2. Prior Art

For this purpose overvoltage protection plug-ins (cf. for example DE 39 21 227 C2) or overvoltage protection magazines (cf. subject matter of DE 30 14 796 C2) are known for front junction block mounting. There is the problem with these plug-in overvoltage protection means that the conductors joined to the individual contacts of the junction module are inaccessible or accessible only with difficulty.

Solutions have been proposed to get round this problem (cf. DE 40 08 386 A1) by plugging-in the overvoltage protection magazines above the junction block in accordance with one mounting position of the latter. This, however, substantially increases the space taken up by the combination of the junction block and overvoltage protection magazine in the vertical direction, thus resulting in these solutions being a disadvantage as regards their space requirement.

This applies likewise to the arrangement as it reads from U.S. Pat. No. 4,781,613 in which the connection boxes and protection boxes are alternatingly rack-mountable.

With the distribution board subassembly as it reads from DE 44 23 339 C1 in which the individual surge arresters are designed for rear plug-in mounting at the operational service side the problem remains that each subassembly needs to be designed relatively complicated and it needs to be assured that it has rear access.

SUMMARY OF THE INVENTION

The invention is based on the object of providing a telecommunications overvoltage protection magazine which is a compact solution in combination with a junction block for protecting the conductors from overvoltages, especially at the line side of a distribution point.

This object is achieved by the overvoltage protection magazine as it reads from claim 1.

Proposed in accordance with the invention is an overvoltage protection magazine which in a totally novel approach can be directly mounted in a telecommunications rack-mounting system behind a junction zone for cable conductors in accordance with one mounting position. In other words the junction zone for cable conductors corresponding to the front part of a known junction block has front access. This junction zone is electrically connectable to the overvoltage protection magazine in accordance with the invention and thus forms the base element for the novel combination of overvoltage protection magazine and junction zone.

This combination in accordance with the invention does away with the known configuration of a rack-mounted junction block and an overvoltage protection magazine plugged into the junction block. Instead, in accordance with the invention the overvoltage protection magazine is now rack-mounted on which the junction zone is front mounted so that the combination of the two cited components has a low profile and thus takes up little room in the critical direction, namely in the vertical direction of a distribution point. In the depth direction of the distribution point the room taken up is less critical so that the invention in this respect results in no serious disadvantages.

To facilitate inserting the surge arresters in the magazine in accordance with the invention it is good practice when this is done from below, from above or partly from above and partly from below, for example alternatingly from above and below, it being particularly preferred when the surge arresters are all insertable from below. As compared to being inserted from above this has the advantage that the conductors joined to the junction zone, which are usually routed at the top above the overvoltage protection magazine, do not obstruct replacing individual arresters. In this arrangement, however, it may also be provided for that recesses are provided at the top side of the magazine at each arrester location so that pressure can be exerted on the arrester from above by a suitable tool, for instance by a screwdriver, to facilitate removing the arrester from below. However, the arresters may also be plugged-in from above or alternatingly from above and below to thus achieve substantially the same advantages as aforementioned in combination with mounting from below. More particularly, recesses may be provided at the underside of the magazine in accordance with the invention for top-inserted surge arresters to facilitate removing the protection components in this situation, too. Basically the surge arresters may also be devised for rear insertion, this being particularly suitable when the magazine can be removed or swung out of its mounting position so that it is accessible from the rear.

Preferred further embodiments of the overvoltage protection magazine in accordance with the invention read from the further claims.

For the mounting means especially the latching means, provided on the overvoltage protection magazine in accordance with the invention it is preferred that these are provided behind the junction zone as mountable on the overvoltage protection magazine in accordance with the invention and electrically connectable thereto so as not to obstruct work done on the junction zone by parts of the rack-mounting system in which the magazine in accordance with the invention can be mounted. Furthermore, it is preferred for the mounting means of the magazine that these are not only located in the mounting position behind the junction zone but also in a rear portion of the overvoltage protection magazine itself to thus enable, for example, the overvoltage protection magazine to be released to a certain extent from its usual mounting position whilst still remaining connected to the rack-mounting system and rendering the overvoltage protection components accessible for replacement.

It is currently good practice to design the overvoltage protection magazine mountable for retraction from the rack-mounting system. In this case the inserted arresters are directly accessible whilst making it possible to provide a certain spare cabling capacity for the conductors joined to the junction zone so as not to endanger the connection to the terminal contacts. As an alternative the overvoltage protection magazine may be designed swivel-mounted on the rack-mounting system.

As described above, a so-called junction zone for joining the cables is connectable to the overvoltage protection magazine in accordance with the invention as a base component of the resulting combination. Advantages are also to be had, however, when the junction zone and the overvoltage protection magazine are integrated in a single module. This module represents to a certain extent a module in which all necessary functions are integrated, it being, however, just as possible to make use of this module, in other words with one and the same module, without surge arresters being inserted therein should this protection function not be needed.

The protection achieved for the conductors to be protected is particularly comprehensive by it additionally comprising in accordance with a preferred embodiment in the connection between incoming and outgoing conductors an overcurrent protection, more particularly a polyswitch.

To render the overvoltage protection magazine in accordance with the invention useful in combination with a junction zone, especially on the line side of a distribution point, it is good practice when the junction zone comprises not only the opposing contact rows for joining incoming and outgoing conductors but also isolating and test contacts arranged in between.

For circuiting the overvoltage protection magazine in accordance with the invention in combination with a junction zone it is good practice to route all conductors to one side of the overvoltage protection magazine to thus make it particularly simple, for example, to swivel the overvoltage protection magazine about the side to which the conductors are routed so that greatly simplified access to the surge arresters, for example, in the swivelled-open position is provided.

BRIEF DESCRIPTION OF THE DRAWINGS

The embodiments as shown in the drawings will now be detailed, in which.

DETAILED DESCRIPTION OF PREFERRED EMBODIMENTS OF THE INVENTIONS

Figure 1:
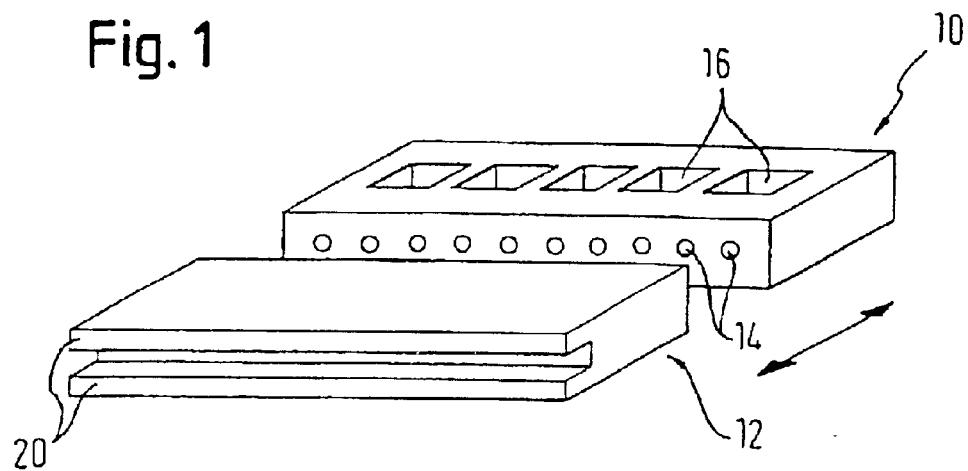
FIG. 1 is a schematic front and bottom view in perspective of the overvoltage protection magazine in accordance with the invention in a first embodiment.

Referring now to FIG. 1 there is illustrated in a front view in perspective the overvoltage protection magazine 10 in accordance with the invention for front-mounting a junction zone 12 in accordance with the mounting position and electrically connectable via the contacts 14 as indicated. In accordance with the invention the overvoltage protection magazine 10 is mountable via mounting means (not shown) in a telecommunications rack-mounting system. Shown in FIG. 1 is the underside of the overvoltage protection magazine in which chambers 16 for receiving surge arresters are configured in accordance with a preferred embodiment, only five of which are shown in FIG. 1. In those embodiments discussed in more detail elsewhere, in which the chambers 16 are included alternatively or additionally on the top side of the magazine 10, the chambers 16 on the top side can be set forth as described with reference to the underside, one embodiment of which is illustrated in FIG. 1. Preferably these chambers are located on the underside of the magazine since insertion is facilitated by the fact that the conductors 18 joining the junction zone 12 are no obstruction since these are usually routed along the top side of the magazine.

As evident from FIG. 1 the junction zone 12 comprises by known ways and means two opposing rows of contacts 20 for joining incoming and outgoing conductors 18, whereby test and isolating contacts may be arranged in between. The connection to the overvoltage protection magazine 10 in accordance with the invention is made via the contacts 14 such that the individual conductors 18 are protected by the surge arresters of the magazine.

Figure 2:
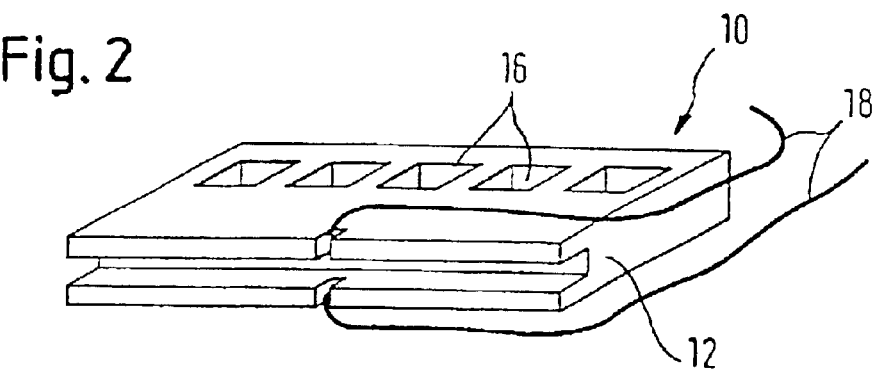
FIG. 2 is a schematic front and bottom view in perspective of the overvoltage protection magazine in accordance with the invention in a second embodiment.

Referring now to FIG. 2 there is illustrated, for one thing, the circuiting of the junction zone 12 with conductors 18. The contacts for joining the conductors are usually arranged in slots, only one of which is indicated in each case in FIG. 1. For another thing, it is evident from the embodiment as shown in FIG. 2 that in this case the junction zone 12 is integrated in the overvoltage protection magazine 10 for joining the cable conductors 18, the overvoltage protection magazine 10 in turn featuring chambers 16 for inserting the surge arresters at its underside as evident from FIG. 2. In FIG. 2 too, the means for securing the overvoltage protection magazine 10 to a telecommunications rack-mounting system are not shown.

It is further to be noted that as evident from FIG. 2 both the incoming and outgoing cable conductors 18 are routed to the right-hand side as shown in FIG. 2 so that the overvoltage protection magazine 10 in accordance with the invention can be configured swivable above this side, this arrangement ensuring to advantage that the swivelling action is not obstructed by the joined cable conductors 18.

Figure 3:
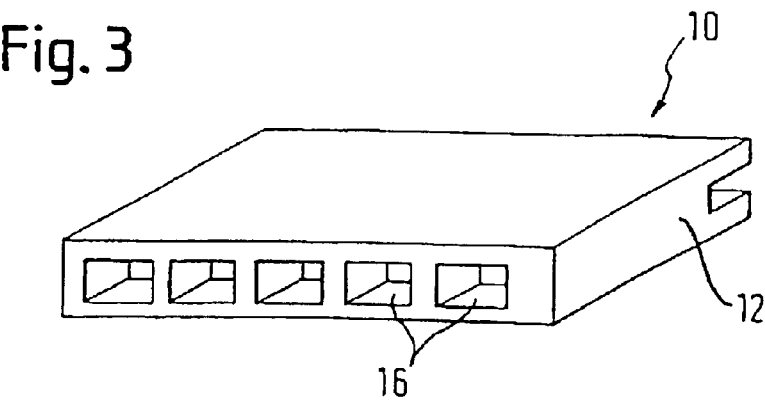
FIG. 3 is a schematic rear view in perspective of the overvoltage protection magazine in accordance with the invention in a third embodiment.

Referring now to FIG. 3 there is illustrated an alternative embodiment of the overvoltage protection magazine 10 including an integrated cable junction zone 12. In this case the chambers 16 for the surge arresters (not shown) are located at the rear side.

Figure 4:
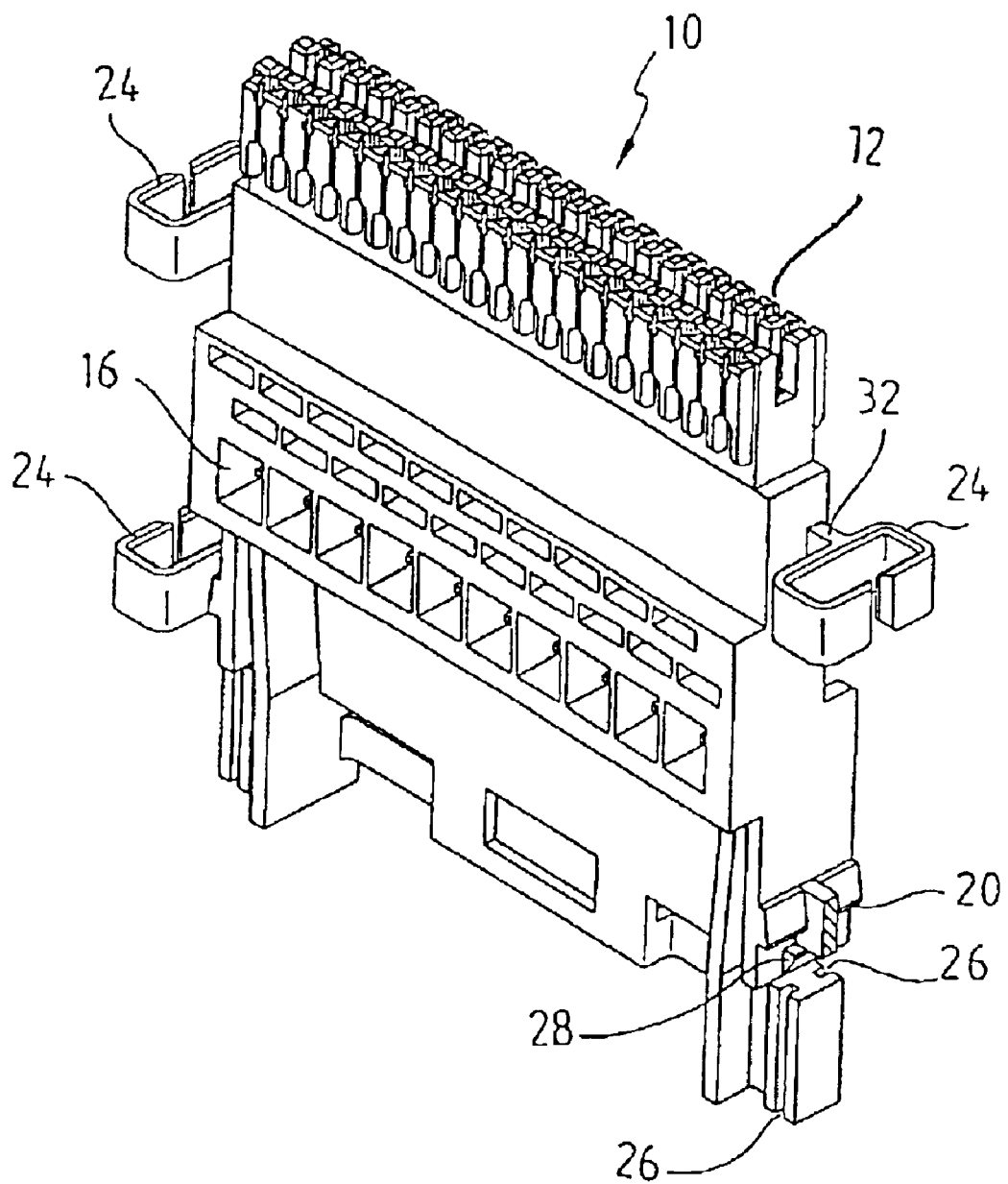
FIG. 4 is a view in perspective of the overvoltage protection magazine in accordance with the invention in a fourth embodiment.

Referring now to FIG. 4 there is illustrated a further embodiment of the overvoltage protection magazine in accordance with the invention including an integrated junction zone 12. As evident from FIG. 4 the module comprises on its top side, which in the mounting position is the front side, two rows of IDC contacts. Surge arresters are insertable in the chambers 16 as evident in the rear portion of the module as shown.

Provided at the narrow sides of the overvoltage protection magazine 10 are wire guide eyelets 24 in a front portion of the module, on the one hand, and in a rear portion, on the other. On the right-hand side, as shown in FIG. 4, the rear wire guide eyelet 24 has been omitted to present a better view of the means provided for mounting the module as shown in a telecommunications rack-mounting system. It is to be noted that the left-hand narrow side of the module as shown is configured correspondingly so that the module can be latched to two identically configured sections of a rack-mounting system, for example, in the form of a trough or two profile rails running parallel to each other.

As regards the rear wire guide eyelet 24 omitted on the right-hand side as shown in FIG. 4 it is to be noted further that, as aforementioned, the wire guide eyelet could join the surface area indicated shaded, although this could also be replaced by an actuating button for advantageously releasing the module. The latching hook 28 may namely be disengaged by pressure being exerted to one side. When the overvoltage protection magazine 10 is in the mounting position, however, the portion to which pressure needs to be exerted is concealed behind sections of the rack-mounting system, so that releasing the latching hook 28 needs to be achieved via the side wire guide eyelet or an actuating button correspondingly located.

The module 10 comprises in a rear portion two grooves 26 opening away from each other, each of which accommodates a side edge of two rack-mounting brackets arranged spaced away from each other. In a portion to the front of these two grooves a first latching hook 28 is configured on the module 10. To the front of the latching hook there is provided a key 20 advantageously defining the location of the module 10 as shown in a front latching position. In conclusion, it is to be noted that the wire guide eyelet 24 evident at the top may be joined to the module 10 in accordance with the invention via a web 32.

It is especially when the module as shown is rack-mountable in a system comprising relatively deep slots that stable mounting of the module is enhanced by not only the mounting means being engaged in the rear portion of the module in the mounting position but also by the web 32 on both sides being introduced into the corresponding slot for stable mounting thereof.

What is claimed is:

1. A telecommunications overvoltage protection magazine permitting in the mounting position direct mounting in a telecommunications rack-mounting system behind a junction zone for cable conductors and electrical connection to said junction zone, the magazine comprising: a plurality of chambers for receiving surge arresters wherein a first plurality of said chambers is located on the underside of said magazine, and a second plurality of said chambers is located on the topside of said magazine.

2. The overvoltage protection magazine as set forth in claim 1, further comprising mounting means, provided behind said junction zone in said mounting position.

3. The overvoltage protection magazine of claim 1, wherein said junction zone is integrated with said overvoltage protection magazine into a module.

4. The overvoltage protection magazine of claim 1, wherein said junction zone comprises two opposing rows of contacts for joining incoming and outgoing cable conductors as well as isolating and test contacts arranged in between.

5. The overvoltage protection magazine of claim 1, wherein it is circuited with incoming and outgoing cable conductors, all of which are routed to one side of said overvoltage protection magazine.

6. The overvoltage magazine of claim 2, wherein said mounting means comprises a latching means.

7. A telecommunications overvoltage protection magazine, comprising:

a front side, rear side opposite said front side, top side, and an underside opposite said top side; wherein said magazine defines a mounting position in the direction between said front and rear sides;

and a plurality of chambers in said magazine, said chambers each configured to receive a surge arrester;

wherein said magazine is configured to be mounted in a telecommunications rack-mounting system in said mounting position; wherein said magazine further comprises a groove extending in the direction between said front and rear sides, and wherein said magazine is configured to be mounted in a telecommunications rack by engagement with said groove.

8. The telecommunications overvoltage protection magazine of claim 7, further comprising a junction zone located at the front side of said magazine, wherein said junction zone comprises a plurality of contacts.

9. The telecommunications overvoltage protection magazine of claim 7, wherein said magazine and said junction zone are integral.

* * * * *